(12) United States Patent
Goh et al.

(10) Patent No.: US 8,924,913 B1
(45) Date of Patent: Dec. 30, 2014

(54) SCHEMATIC DISPLAY OF CONNECTIVITY IN AN INTEGRATED CIRCUIT DESIGN

(71) Applicant: Altera Corporation, San Jose, CA (US)

(72) Inventors: Denis Chuan Hu Goh, Gelugor (MY); Choi Phaik Chin, Bayan Lepas (MY); Goet Kwone Ong, Pulau Pinang (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/922,500

(22) Filed: Jun. 20, 2013

(51) Int. Cl.
*G06F 15/04* (2006.01)
*G06F 17/20* (2006.01)
*G06F 17/50* (2006.01)

(52) U.S. Cl.
CPC .................. *G06F 17/5045* (2013.01)
USPC ........... 716/139; 716/102; 716/106; 716/107; 716/126

(58) Field of Classification Search
CPC ............ G06F 17/5045; G06F 17/5022; G06F 11/261; G06F 2217/74; G06F 17/5068; G06F 17/5072
USPC .......................... 716/102, 106, 107, 126, 139
See application file for complete search history.

(56) References Cited

U.S. PATENT DOCUMENTS

| | | | | |
|---|---|---|---|---|
| 5,850,349 A | * | 12/1998 | Hirai et al. | 716/124 |
| 5,894,420 A | * | 4/1999 | Duncan | 716/102 |
| 6,028,810 A | * | 2/2000 | Ooishi | 365/230.03 |
| 6,834,375 B1 | * | 12/2004 | Stine et al. | 716/56 |
| 7,010,773 B1 | * | 3/2006 | Bartz et al. | 716/121 |
| 7,178,123 B2 | * | 2/2007 | Lin et al. | 716/102 |
| 8,191,035 B1 | * | 5/2012 | Van Brink et al. | 716/139 |
| 8,205,183 B1 | * | 6/2012 | Goh et al. | 716/126 |
| 2002/0147809 A1 | | 10/2002 | Vinberg | |
| 2005/0268269 A1 | * | 12/2005 | Coiley | 716/11 |
| 2006/0101368 A1 | * | 5/2006 | Kesarwani et al. | 716/11 |
| 2010/0005438 A1 | * | 1/2010 | Nakamura | 716/11 |
| 2010/0115487 A1 | * | 5/2010 | Tripathi et al. | 716/12 |
| 2010/0251201 A1 | * | 9/2010 | Chin et al. | 716/18 |
| 2010/0283505 A1 | * | 11/2010 | Koch et al. | 326/41 |
| 2012/0117530 A1 | | 5/2012 | Green | |
| 2012/0304105 A1 | | 11/2012 | LaFever et al. | |

* cited by examiner

*Primary Examiner* — Thuan Do
*Assistant Examiner* — Brian Ngo
(74) *Attorney, Agent, or Firm* — David C. Kellogg

(57) ABSTRACT

A method of displaying a schematic diagram of an integrated circuit design is disclosed. The integrated circuit design includes a plurality of logic blocks and the schematic diagram may include a plurality of connections between respective pairs or groups of the logic blocks. The method includes identifying a plurality of interconnect lines that is adapted to schematically illustrate the plurality of connections. Selected interconnect lines out of the plurality of interconnect lines is identified. Portions of the selected interconnect lines may be channeled through a global connection line on the schematic diagram. The global connection line may be a graphical line that spans from one edge of the schematic diagram to another.

18 Claims, 14 Drawing Sheets

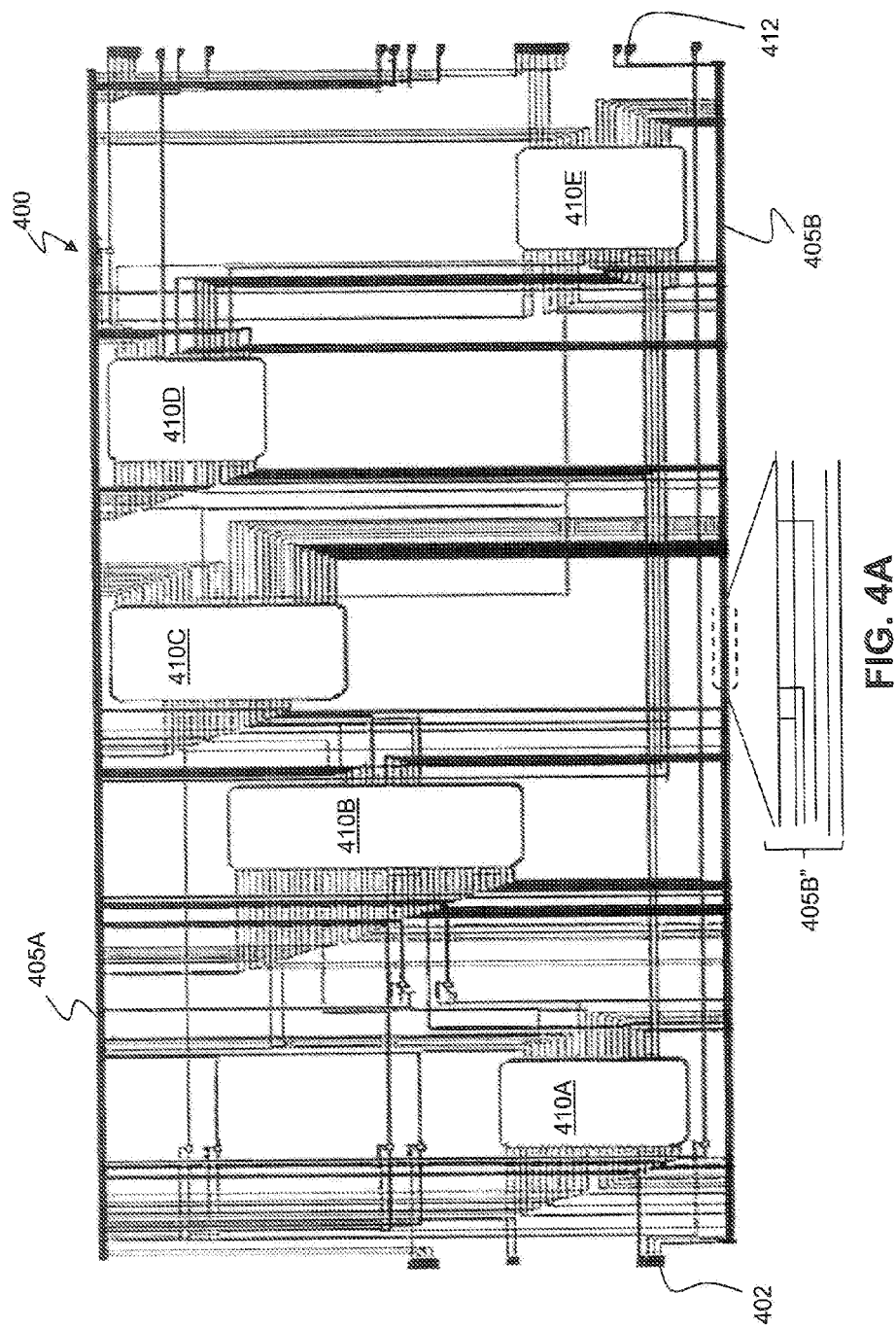

SCHEMATIC DISPLAY OF CONNECTIVITY IN AN INTEGRATED CIRCUIT DESIGN

BACKGROUND

Integrated circuit devices, such as field-programmable gate arrays (FPGAs), application specific integrated circuits (ASICs), and the like, may be used to implement a variety of functions. For instance, an FPGA device may be configured to perform various user functions based on different user designs. Generally, electronic design automation (EDA) or computer-aided design (CAD) tools are used by circuit designers or design engineers to create circuit designs (commonly referred to as user designs) on integrated circuit devices.

As an example, an EDA tool may typically include a schematic viewer tool that produces a graphical representation of a circuit design by illustrating circuit elements and the interconnections between the different circuit elements in the circuit design. Such graphical representations are commonly known as schematic diagrams. Often times, a circuit design may have many different connections going from one circuit element to another.

To enable a user or circuit designer to trace a signal path in a circuit design, each signal path (e.g., an interconnect line that connects one circuit element to another) may be represented as a single wire net (depicted by a graphical line) in a schematic design. The resulting schematic diagram may thus be cluttered with wire nets (representing all the different interconnections in the circuit design), making it difficult for the user to analyze the circuit.

Occasionally, a group of wire nets from one circuit element coupled to another circuit element (e.g., a 16-bit output from a logic block coupled to a 16-bit input of another logic block) may be represented as a single bus line in a schematic diagram. However, for circuit elements that may not be directly coupled to each other or have the same number of input/output bits, individual wire nets are typically shown.

Tracing signal connectivity in a large schematic diagram may therefore be time consuming when the schematic diagram is overcrowded with wire nets representing different interconnections between multiple circuit elements.

SUMMARY

Techniques for creating a simplified schematic diagram to enable a user to analyze a circuit design efficiently are provided. Embodiments of the present invention include methods to produce schematic diagrams without losing vital circuit connectivity information, thereby preserving overall schematic functionality.

It is appreciated that the present invention can be implemented in numerous ways, such as a process, an apparatus, a system, a device or a computer readable medium. Several inventive embodiments of the present invention are described below.

A method of displaying a schematic diagram of an integrated circuit may include identifying a plurality of interconnect lines. The integrated circuit design may have a plurality of logic blocks and the schematic diagram may include a plurality of connections between respective pairs or groups (e.g., groups of 3 or more) of the logic blocks. Each interconnect line of the plurality of interconnect lines displayed may schematically illustrate one of the connections. The method further includes identifying selected interconnect lines out of the plurality of interconnect lines and channeling portions of the selected interconnect lines through a global connection line on the schematic diagram.

A method of generating routing paths in a schematic diagram of an integrated circuit design may include identifying a source node and a destination node in the integrated circuit design. First and second routing paths that connect the source node to the destination node in the schematic diagram may then be identified. The method further includes comparing the number of bends in the first routing path with the number of bends in the second routing path. In response to the comparison, one of the two routing paths in the schematic diagram may be displayed on an electronic display device (e.g., a monitor). The schematic diagram may include a global connection line. The first routing path may not pass through the global connection line while a portion of the second routing path may pass through the global connection line. Multiple routing paths (or at least portions of different routing paths) may be routed through the global connection line in the schematic diagram.

Software on a computer readable medium may include code for receiving circuitry design data associated with an integrated circuit device. The circuitry design data may be received with a computer-aided design tool. The software may further include code for generating a schematic diagram from the received circuitry design data. The schematic diagram may be generated by a schematic display viewer engine that is contained in the computer-aided design tool. The generated schematic diagram may include at least a global connection line and may include a plurality of wire nets. At least some wire nets of the plurality of wire nets in the schematic diagram may be routed through the global connection line.

BRIEF DESCRIPTION OF THE DRAWINGS

FIG. 4A shows an illustrative schematic diagram with global connection lines in accordance with embodiments of the present invention.

DETAILED DESCRIPTION

The embodiments provided herein include techniques to produce a graphical representation of a circuit design with minimal visual clutter.

It will be obvious, however, to one skilled in the art, that the present exemplary embodiments may be practiced without some or all of these specific details. In other instances, well-known operations have not been described in detail in order not to unnecessarily obscure the present embodiments.

Figure 1:
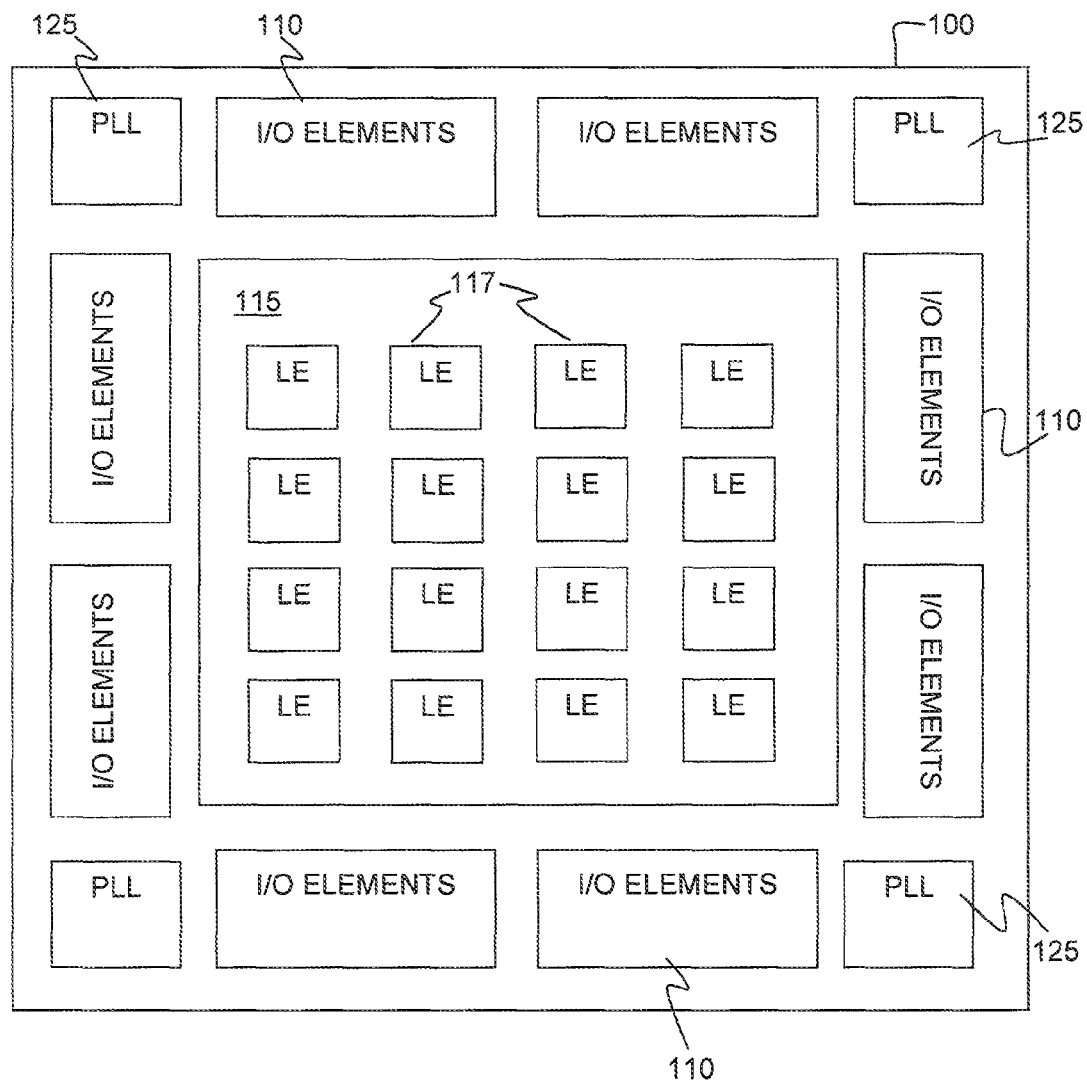
FIG. 1 is a simplified block diagram of an integrated circuit in accordance with embodiments of the present invention.

An IC device such as a field-programmable gate array (FPGA) device or an application specific integrated circuit (ASIC) device, generally includes, among others, memory modules, logic blocks, clock generation circuitry, and input-output elements. FIG. 1, meant to be illustrative and not limiting, shows a simplified block diagram of IC 100. IC 100 includes core logic region 115 and input-output elements 110. Other auxiliary circuits, such as phase-locked loops (PLLs) 125, for clock generation and timing, can be located outside core logic region 115 (e.g., at corners of IC 100 and adjacent to input-output elements 110).

Signals received from external circuitry at input-output elements 110 may be routed from input-output elements 110 to core logic region 115 or other logic blocks (not shown) on IC 100. Core logic region 115 (or more specifically, logic elements (LEs) 117 or core registers within core logic region 115) may perform functions based on the signals received. Accordingly, signals may be sent from core logic region 115 and other relevant logic blocks of IC 100 to other external circuitry or components that may be connected to IC 100 through input-output elements 110. It should be appreciated that a single device like IC 100 can potentially support a variety of different interfaces and each individual input-output bank 110 can support a different input-output standard with a different interface or protocol (e.g., high-speed serial interface protocol).

As shown in FIG. 1, core logic region 115 may be populated with logic cells that may include LEs 117 or core registers, among other circuits. The LEs may further include look-up table-based logic regions and may be grouped into "Logic Array Blocks" (LABs). The LEs and groups of LEs or LABs can be configured to perform logical functions desired by a user or circuit designer.

As an example, a circuit designer may design a circuit that performs specific logic functions. Typically, a circuit designer may use an electronic design automation (EDA) tool when designing a circuit. The process of designing a circuit to be implemented on an IC device such as IC 100 may be done in several steps with a typical EDA tool. The EDA tool may accordingly produce an output file (e.g., a configuration file) that is then used to configure the IC device with the user design. Accordingly, core logic region 115 may further include random access memory elements, such as static random access memory (SRAM) cells, configuration RAM (CRAM) and look-up table RAM (LUTRAM) cells (not shown in FIG. 1), that may be used to hold configuration data. For instance, configuration data (from the configuration file) loaded into configuration memory on IC 100 may be used to produce control signals that configure any of the LEs 117 and groups of LEs and LABs to perform desired logical functions.

Figure 2:
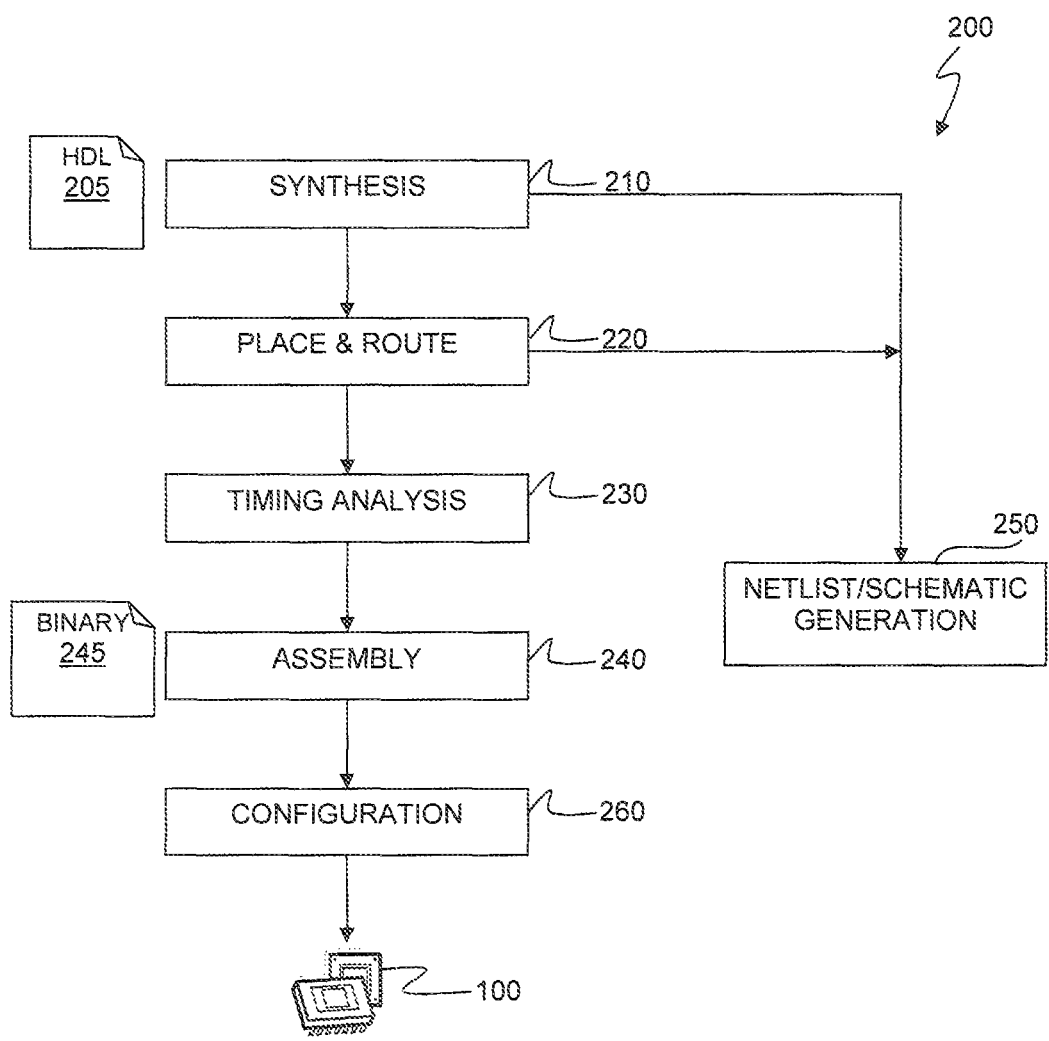
FIG. 2 depicts an illustrative diagram of a method to create and compile a circuit design for an integrated circuit using an electronic design assistant (EDA) tool in accordance with embodiments of the present invention.

FIG. 2 depicts illustrative method 200 to create and compile a circuit design for an IC using an EDA tool in accordance with embodiments of the present invention. Method 200 may begin when a circuit designer or engineer create a circuit design that is embodied in a hardware description language (HDL) file 205. HDL file 205 may be synthesized by the EDA tool during synthesis step 210. For instance, synthesis operation performed at step 210 may translate the circuit design embodied in HDL file 205 into a discrete netlist of logic-gate primitives. The synthesized logic gates in the circuit design are then placed and routed on a target IC device during a place and route operation at step 220. Generally, wire nets may be added to connect the logic gates and other components on the target IC device to route signals in the circuit design during the place and route operation at step 220.

After the place and route operation, a timing analysis operation may be performed at step 230. It should be appreciated that the timing analysis operation may compute the lengths of different paths in the circuit design and the timing constraints of the overall circuit design. Binary configuration file 245 may then be produced during an assembly operation at step 240. Binary configuration file 245 contains description of the circuit design and may be used to program IC device 100 (e.g., contents of binary configuration file is loaded onto IC device 100) during a configuration operation at step 260. Alternatively, binary configuration file 245 may contain description to produce integrated circuit masks that can then be used to fabricate the IC device.

In some embodiments, after the synthesis operation at step 210 or the place and route operation at step 220, a netlist or schematic generation operation may be performed at step 250. For instance, the EDA tool may include a schematic viewer engine that generates a graphical representation of the circuit elements (e.g., logic gates, etc.) and interconnections between them (commonly referred to as a schematic diagram) when the schematic generation operation is performed at step 250. The generated schematic diagram may be used by the circuit designer to analyze the design to determine if the circuit will operate as desired when the design is loaded onto IC device 100. Accordingly, the schematic viewer engine may be an interactive tool that allows the generated schematic diagram to be edited or updated by the circuit designer.

Figure 3:
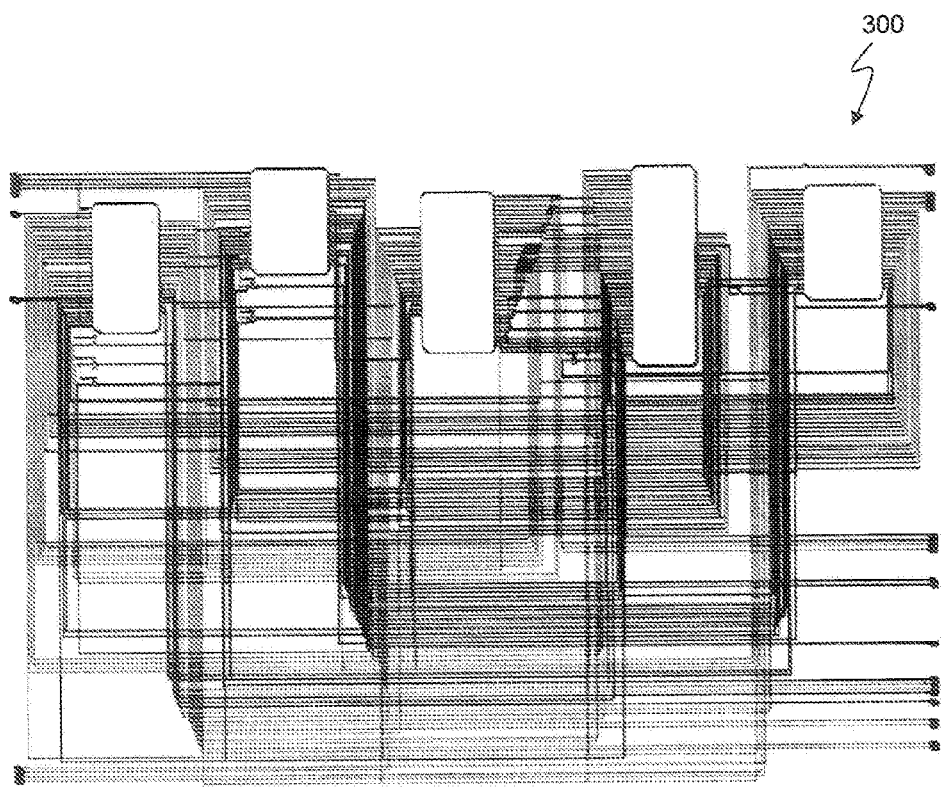
FIG. 3 shows a conventional schematic diagram of a circuit design.

Circuit designs in general may incorporate thousands of circuit elements (or more). As a result, the generated schematic diagram may be complex and difficult to analyze. FIG. 3 shows a conventional schematic diagram 300 of a typical circuit design. Schematic diagram 300 is overcrowded with wire nets that connect one logic block to another. Even though it may not be entirely impossible to trace or traverse through different interconnects in schematic diagram 300 (commonly referred to as "rat nets"), it is highly inefficient. Due to the number of interconnects involved, the process of traversing through a cluttered schematic diagram such as schematic diagram 300 may be highly error prone. It may also be time consuming to identify and trace specific interconnects within schematic diagram 300.

FIG. 4A shows illustrative schematic diagram 400 with global connection lines in accordance with embodiments of the present invention. Compared to schematic diagram 300 of FIG. 3, schematic diagram 400 is relatively less cluttered. A portion of the interconnect lines from various circuit elements, such as input ports 402, logic blocks 410A-410E and output ports 412, may be routed through global connection lines 405A and 405B at the top and bottom, respectively, of schematic diagram 400. As shown in the embodiment of FIG. 4A, using a global connection line such as 405A or 405B may significantly reduce clutter in the schematic diagram.

Each of global connection lines 405A and 405B may be drawn as a single bus wire that stretches from one end of schematic diagram 400 to another. In some embodiments, any number of wire nets may be routed through either one of the global interconnect lines 405A and 405B. Either of the global interconnect lines 405A and 405B may be expanded to reveal individual interconnect lines within them (as shown by the zoomed-in portion 405B"). The height or thickness of each of the global connection lines 405A and 405B may be varied. In some embodiments, the height or thickness of a global connection line such as 405A or 405B may be proportional to the number of wire nets being routed through it. In another embodiment, global connection lines 405A and 405B may be of different colors to denote different numbers of wire nets being routed through them. It should be appreciated that even though two global connection lines (e.g., global connection lines 405A and 405B) are shown in FIG. 4A (and other figures) additional or fewer global connection lines may be included in a schematic diagram.

Figure 4B:
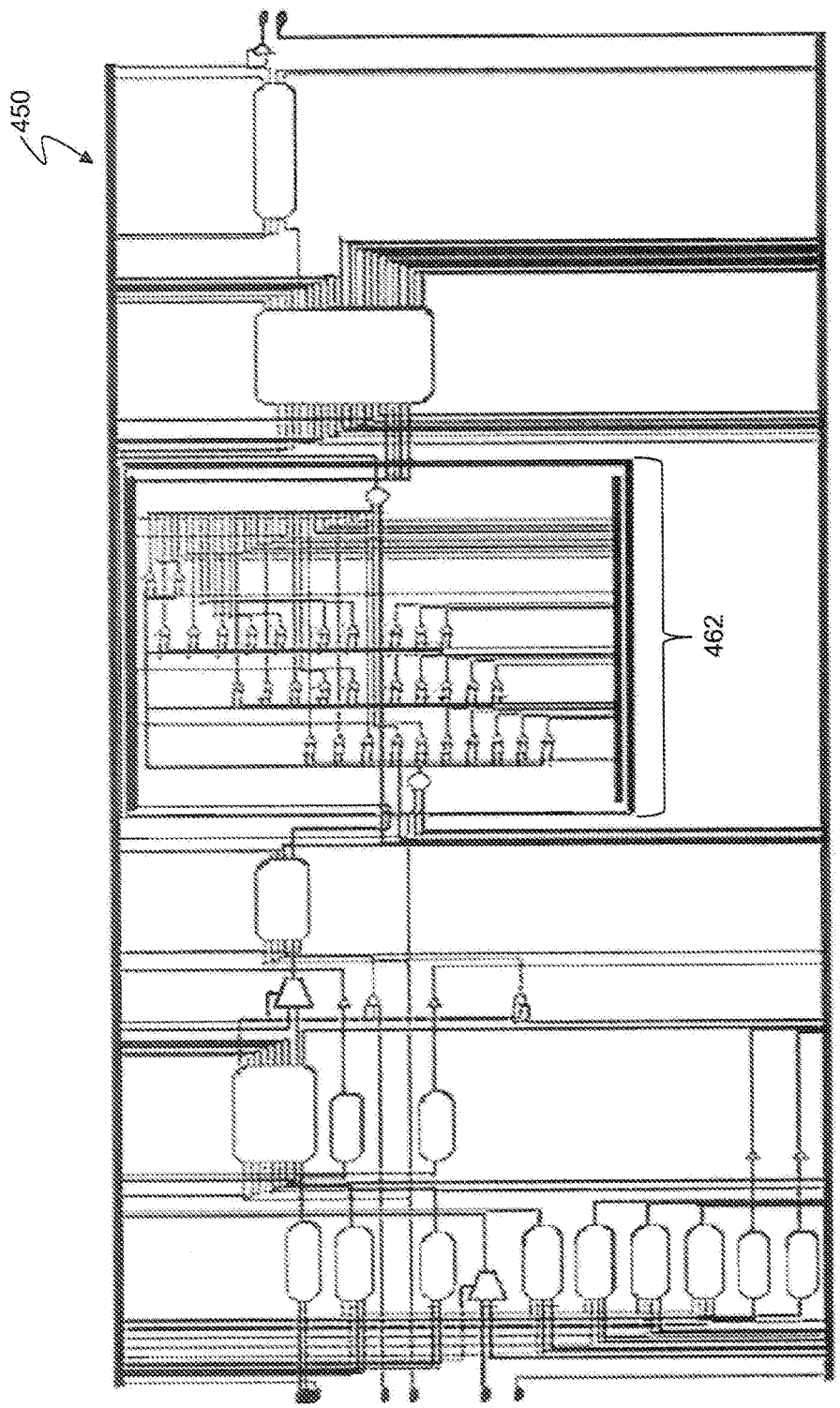
FIG. 4B shows an illustrative schematic diagram with a nested netlist in accordance with embodiments of the present invention.

FIG. 4B shows schematic diagram 450 with a nested netlist 462 in accordance with embodiments of the present invention. Some of the logic blocks in schematic diagram 450 (or schematic diagram 400 of FIG. 4A) may be expanded to reveal a more detailed schematic diagram of that particular block. As an example, a logic block in schematic diagram 450 may be expanded to reveal the actual netlist or circuit representation of that block (shown as nested netlist 462). Nested netlist 462 may include its own global connection lines that are used to route some of the wire nets in that particular logic block.

Figure 5A:
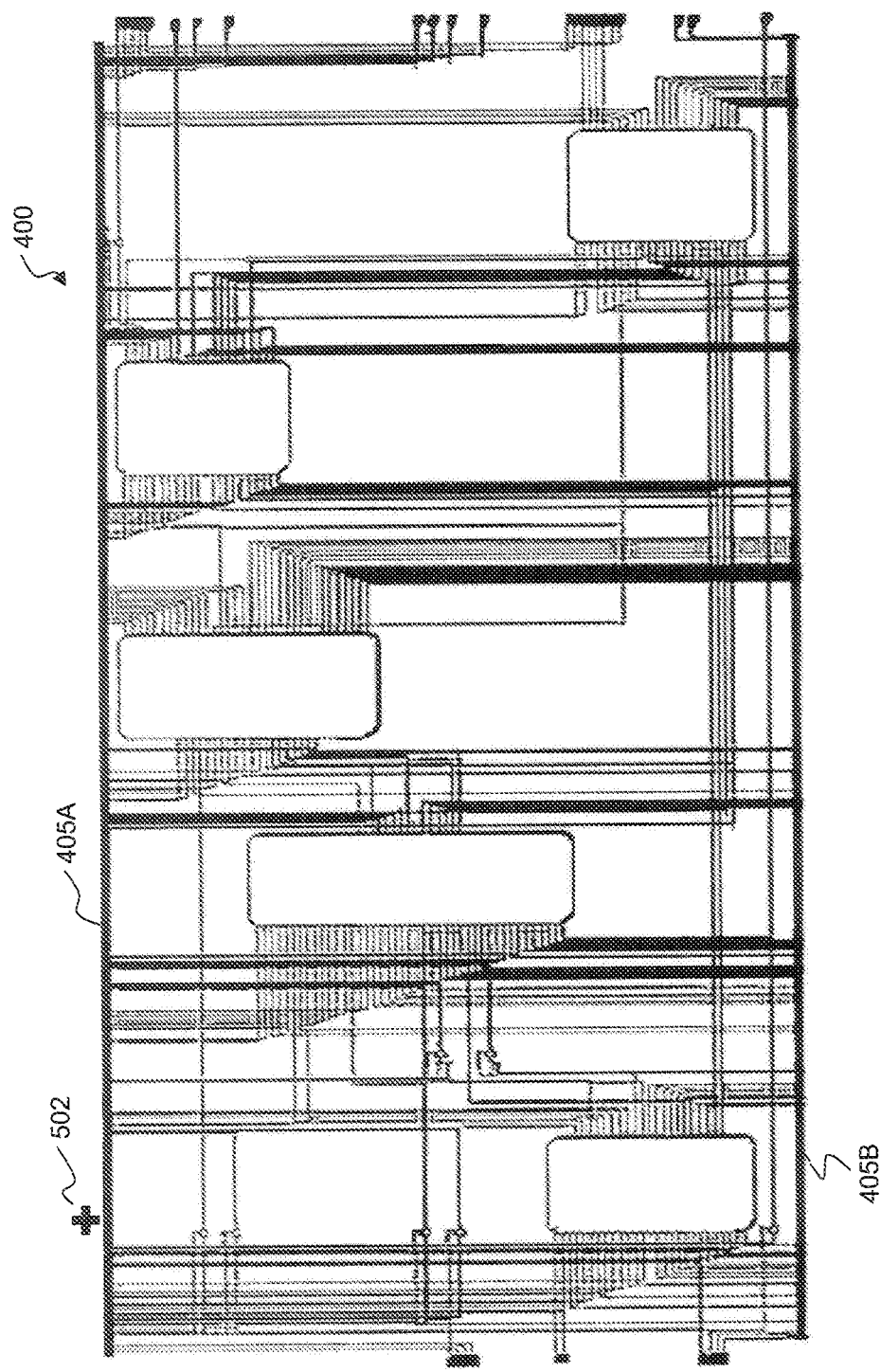
FIG. 5A shows an illustrative schematic diagram with a visual symbol to represent an expandable global connection line in accordance with embodiments of the present invention.

FIG. 5A shows illustrative schematic diagram 400 with a visual symbol to represent an expandable global connection line in accordance with embodiments of the present invention. Symbol 502 at the top of global connection line 405A may be used to toggle (e.g., hide and unhide) the wire nets within global connection line 405A. As an example, when a user (with the aid of an input device such as a mouse or a resistive/capacitive touchscreen) clicks on symbol 502, global connection line 405A may be expanded to reveal all the wire nets that are being routed through it. When a global connection line is expanded, symbol 502 may be replaced with a symbol, such a minus sign, identifying an option to collapse the individual wire nets back into the global connection line. It should be appreciated that even though a specific symbol is shown in the embodiment of FIG. 5A, different symbols may be used in this context. In some embodiments, the program (e.g., an EDA tool with a schematic viewer engine), may accept a specific set of input sequence (e.g., double clicking on global connection line 405A or 405B) to show or hide the wire nets within a global connection line.

Figure 5B:
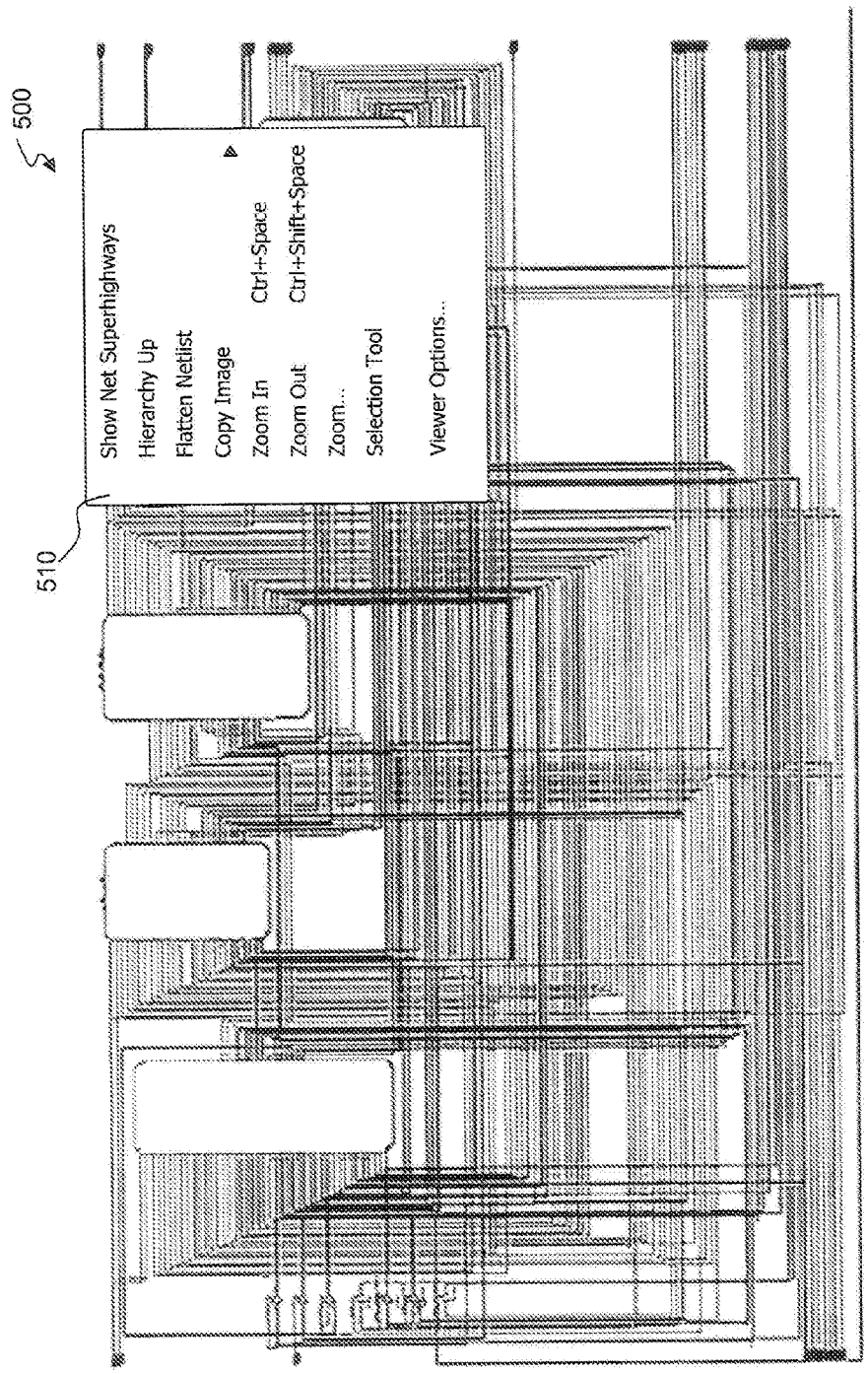
FIG. 5B shows an illustrative schematic diagram where the global connection lines have been expanded to reveal all the wire nets in the schematic diagram in accordance with embodiments of the present invention.

FIG. 5B shows illustrative schematic diagram 500 where the global connection lines have been expanded to reveal all the wire nets in the diagram in accordance with embodiments of the present invention. As shown in FIG. 5B, a software program (such as a schematic viewer engine in an EDA tool) may display user interface 510. In some embodiments, user interface 510 may include a list of options available to a user running the program. User interface 510 allows the user to show (or hide) global connection lines (if any) in schematic diagram 500. As an example, if the user wants to hide at least a portion of the wire nets in schematic diagram 500, the user may accordingly select the "Show Net Superhighways" (the global connection lines may sometimes be referred to as "net superhighways") option from user interface 510. As shown in FIG. 5B, when the global connection line is expanded to show all the wire nets being routed within it, the global connection line may be removed from the resulting schematic diagram. Other options that may be provided by the EDA tool (e.g., "hierarchy up," "flatten netlist," "copy image," etc.) are not described in detail in order to not unnecessarily obscure the present invention.

Figure 6:
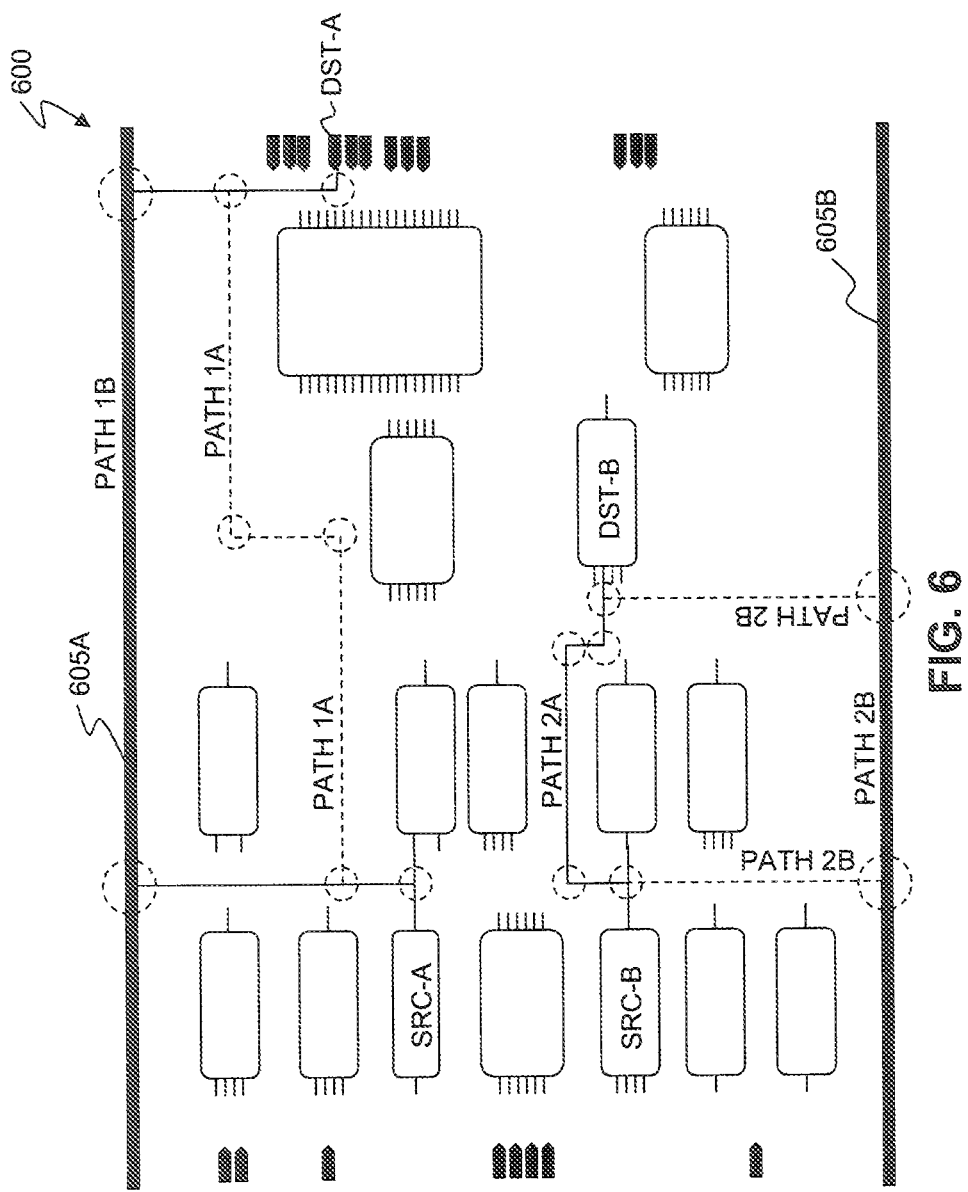
FIG. 6 shows an illustrative schematic diagram after block placement and prior to the placement of wire nets in accordance with embodiments of the present invention.

FIG. 6 shows illustrative schematic diagram 600 after block placement and prior to the placement of wire nets in accordance with embodiments of the present invention. Generally, when a circuit design has been synthesized by an EDA tool (e.g., after the synthesis operation at step 210 of FIG. 2) a schematic diagram may be generated based on the synthesized netlist. However, prior to the generation of the complete schematic diagram (i.e., a complete schematic diagram with all the routing paths or wire nets shown) logic blocks in the design may be arranged and placed according to different factors. For instance, the placement of a logic block may be determined based on the number and source(s) of signals feeding the logic block as well as the number of output signals and destination(s) from that particular logic block. As an example, logic blocks that are coupled together may be placed adjacent to each other in the resulting schematic diagram. It should be appreciated that specific criteria that may be used to determine the actual placement of logic blocks in a schematic diagram are not described in detail in order to not unnecessarily obscure the present invention.

In general, prior to the forming of the routing paths or wire nets in a schematic diagram, a diagram without the actual routing paths or wire nets such as schematic diagram 600 may be generated by the EDA tool. At this stage, the diagram may or may not be displayed or shown to the user. Once the logic blocks are placed, the EDA tool or the schematic viewer engine in the EDA tool may determine how wire nets may be routed in the schematic diagram.

In FIG. 6, two examples are shown. In one example, logic block SRC-A is coupled to port DST-A. In another example, logic block SRC-B is coupled to logic block DST-B. In the first example, two paths may be formed from logic block SRC-A to port DST-A. PATH 1A is a path that travels through gaps between other logic blocks in the schematic while PATH 1B is a path that is routed through global connection line 605A. In this instance, to reach port DST-A from logic block SRC-A, PATH 1A requires six bends (shown in dotted-line circles in FIG. 6) while PATH 1B requires four bends. In some embodiments, a schematic viewer engine may select PATH 1B at least partially based on the fact that it requires fewer number of bends to reach its destination compared to PATH 1A. As such, the resulting schematic diagram may show signals being routed from logic block SRC-A to port DST-A via global connection line 605A.

In the second example, logic block SRC-B may be coupled to logic block DST-B via PATH 2A or PATH 2B. PATH 2A is a path that travels through gaps between other logic blocks in the schematic while PATH 2B is a path that is routed through global connection line 605B. In this case, both PATH 2A and PATH 2B require the same number of bends (a total of four bends) to reach the destination, logic block DST-B. In this case, the schematic viewer engine may select the shorter of the two paths (e.g., PATH 2B). Accordingly, PATH 2B may be shown in the resulting schematic diagram. Even though specific routing or selection decisions are described, whether or not a particular path is routed through a global connection line such as global connection line 605A or 605B may depend on several other factors. As an example, a user may specify a thickness of a particular global connection line or the global connection line may have a maximum number of wire nets that may be routed through it. The schematic viewer engine may accordingly display connection paths in the schematic diagram based on some of these factors and other factors.

Figure 7A:
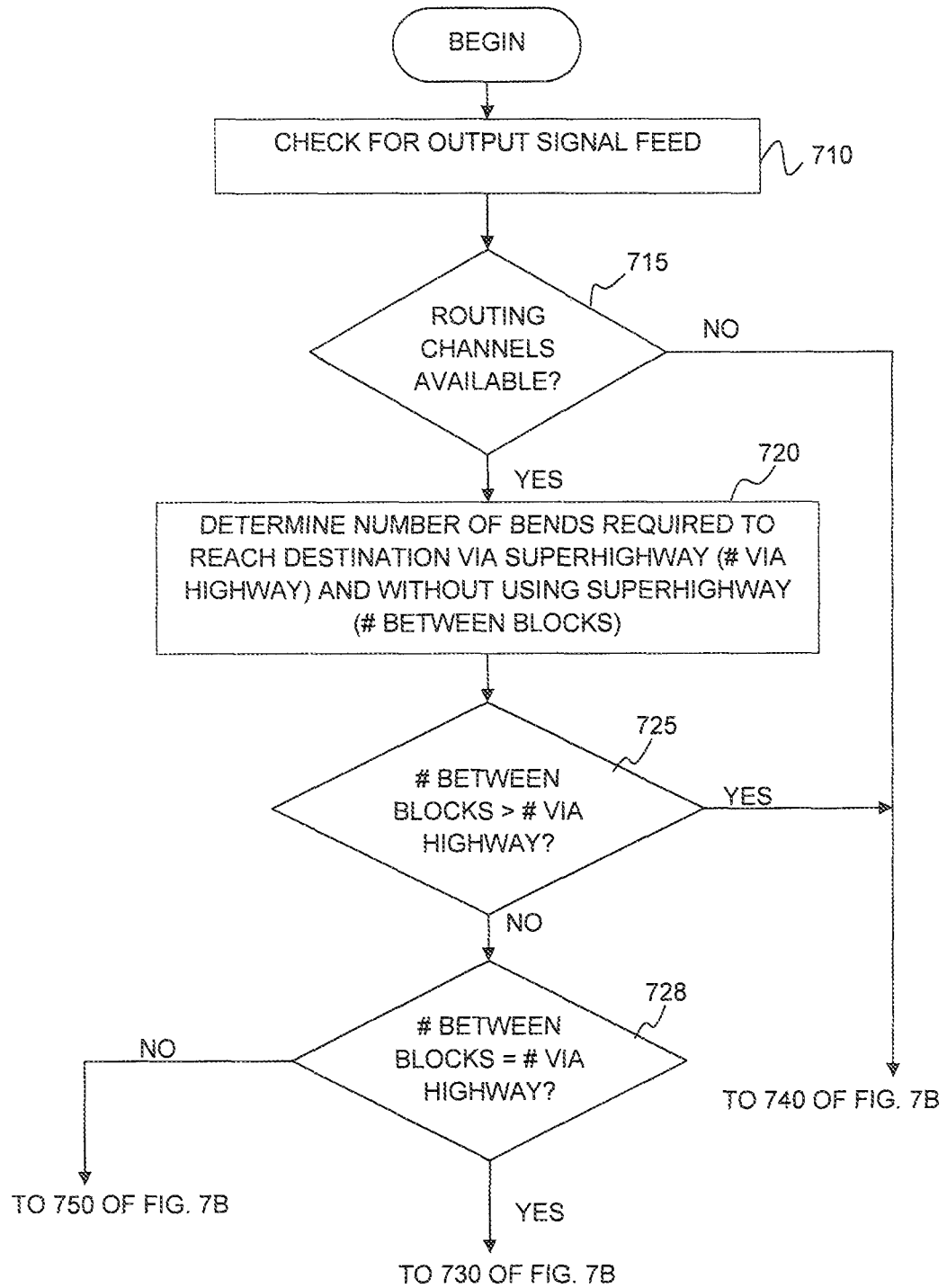
FIGS. 7A and 7B depict an illustrative diagram for a method for generating routing paths in a schematic diagram in accordance with embodiments of the present invention.
Figure 7B:
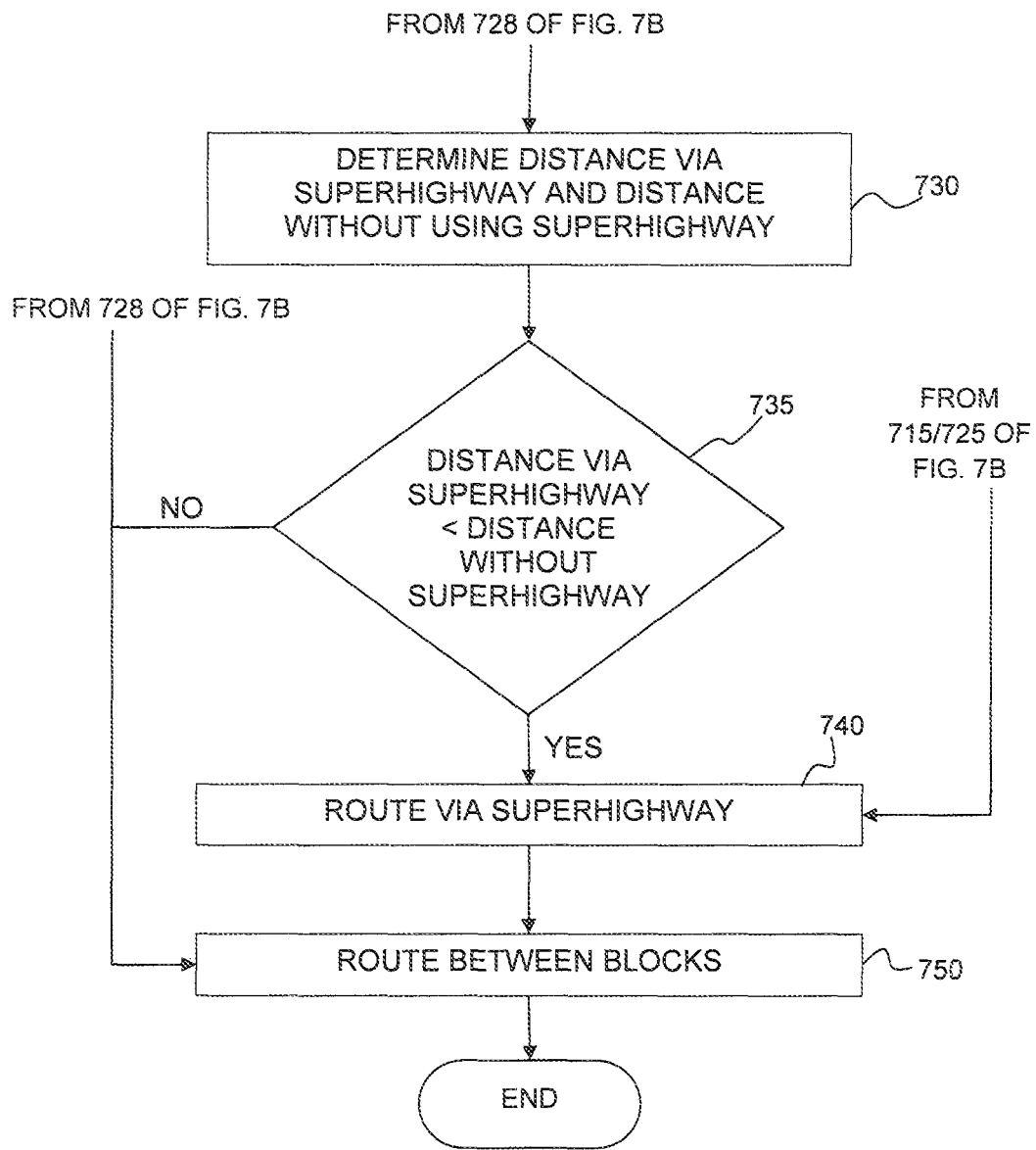

FIGS. 7A and 7B depict an illustrative method for generating routing paths in a schematic diagram in accordance with embodiments of the present invention. It should be appreciated that the method depicted in FIGS. 7A and 7B may be performed by a program such as an EDA tool. The method may be part of a compilation flow performed by a user (e.g., a circuit designer), similar to that shown in FIG. 2. At step 710, output signal feeds are checked. As an example, source and destination nodes in a synthesized circuit design may be identified. The output feeds from the identified source nodes (e.g., logic elements) in the synthesized circuit design may be checked to determine their respective destination nodes. Step 715 determines (for every source node or logic element in the circuit design) if routing space is available to route a wire net between logic blocks in the circuit design. If there is no space available in the schematic diagram to route a wire net from a particular source logic element to its destination, the signal feed is routed via the "superhighway" or global connection line at step 740.

If routing space is available between logic blocks in the circuit design, a routing path may be formed from the source logic element to its destination (e.g., the routing path may or may not pass through the "superhighway" or global connection line). In some embodiments, two paths may be formed (e.g., PATH 1A and PATH1B or PATH 2A and PATH 2B of FIG. 6). At step 720, the number of bends on a first path that uses a global connection line is determined. (This path may be referred to as a "superhighway" and may be similar to PATH1B or PATH 2B of FIG. 6.) Similarly, the number of bends on a second path that does not use the global connection line (e.g., via a path that is routed along any available space between logic blocks in the circuit design) may also be determined at step 720. (This path may be similar to PATH 1A or PATH 2A of FIG. 6.)

Step 725 determines if the number of bends on the second path is greater than the number of bends on the first path. If it is, the method proceeds to step 740 of FIG. B and the first path (a path that is routed via the "superhighway") is selected. Alternatively, if the number of bends on the second path is not greater than the number of bends on the first path, the method proceeds to step 728 of FIG. 7A.

Step 728 determines if the number of bends on the first path is equal to the number of bends on the second path. If it is not (i.e., if the number of bends on the second path is fewer than the number of bends on the first path), the method proceeds to step 750 of FIG. B and the second path (a path that is routed along any available space between logic blocks in the circuit design) is selected.

If the number of bends on the first path is equal to the number of bends on the second path, the method proceeds to step 730 of FIG. 7B and the respective distances of the two paths are determined at step 730. At step 735, the distances of the two paths are compared. If the first path is shorter than the second path, the first path is selected and the output signal feed is routed via the global connection line or "superhighway" at step 740. If the second path is shorter than the first path, the second path is selected and the output signal feed is routed between the logic blocks in the circuit design (without using the global connection line) at step 750.

In one embodiment, in situations when two different paths have equal lengths and the same number of bends, a random selection may be made to select either the first or the second path. In another embodiment, in similar situations, the path that is selected may depend on other factors such as the number of paths that have already been routed via the global connection line or "superhighway." As an example, a user (or the tool) may specify a maximum value for the number of paths that may be routed through a "superhighway," and when the number of paths that have been routed via the "superhighway" reaches the maximum value, additional paths may not be routed via the "superhighway." As another example, the number of bends, length of a particular path, and other factors, if desired, may each be weighted and the resulting sum may be used to determine which path to display or be routed via the "superhighway."

Figure 8A:
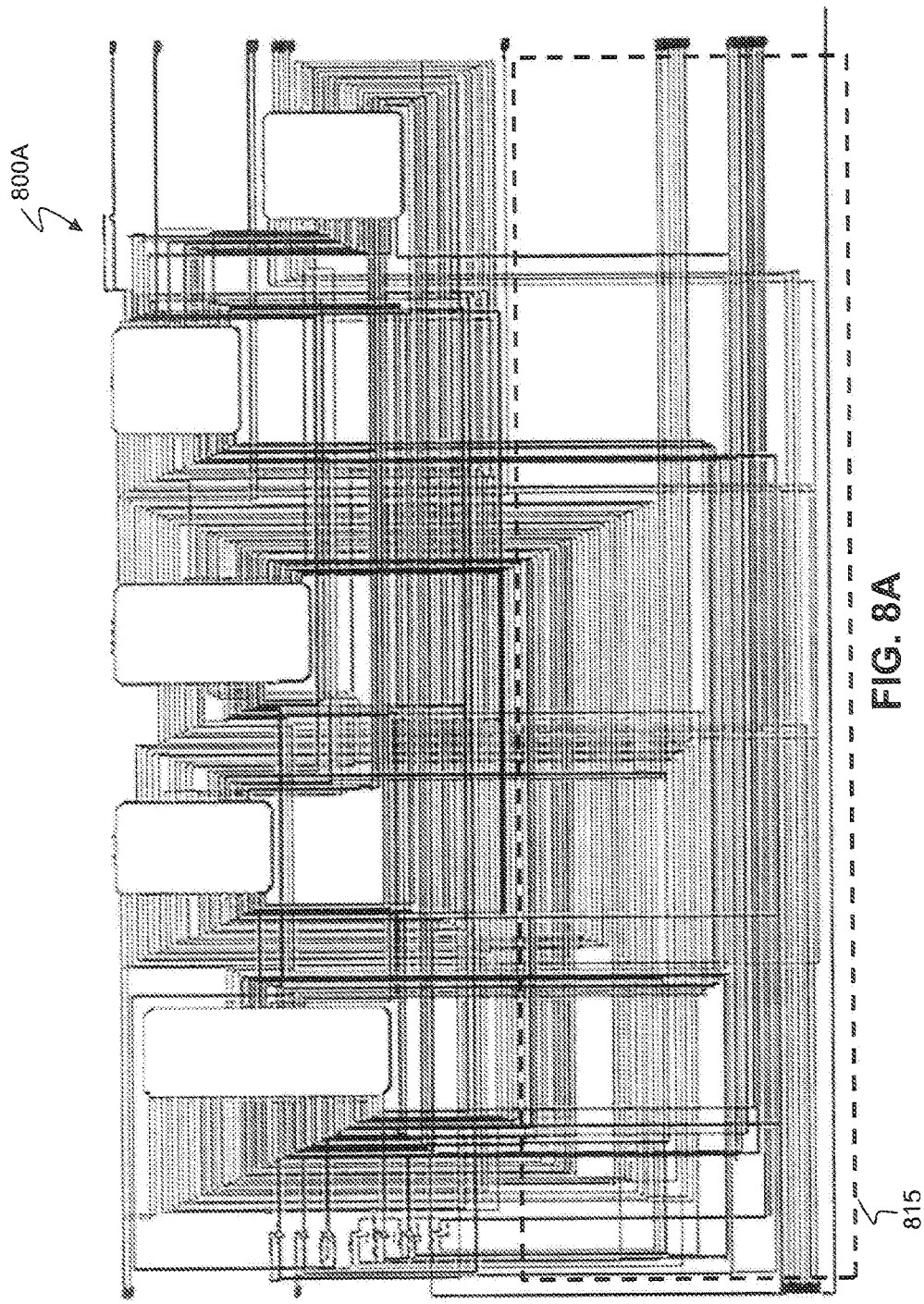
FIG. 8A depicts an illustrative schematic diagram with all the wire nets shown and a resulting schematic diagram with a global connection line in accordance with embodiments of the present invention.

FIG. 8A depicts a schematic diagram with all the wire nets shown and a resulting schematic diagram with a global connection line in accordance with embodiments of the present invention. Schematic diagram 800A is a diagram with all the wire nets or connection paths shown. In some embodiments, schematic diagram 800A may be generated by a schematic viewer engine in a CAD tool and displayed on a display device such as a monitor. The schematic viewer engine may receive different inputs from a user who is using the tool.

As an example, the user may select specific wire nets or a portion of all the wire nets shown through a specific set of input sequence via an input device (e.g., a mouse that is connected to a computing equipment that is running the tool, a touch pad or screen input device, etc.). In the embodiment of FIG. 8A, dotted-line box 815 may be a selection made by a user. Based on the user selection highlighted by dotted-line box 815, the portion of routing paths within dotted-line box 815 may be collapsed into a single global connection line (or routed via a "superhighway").

Figure 8B:
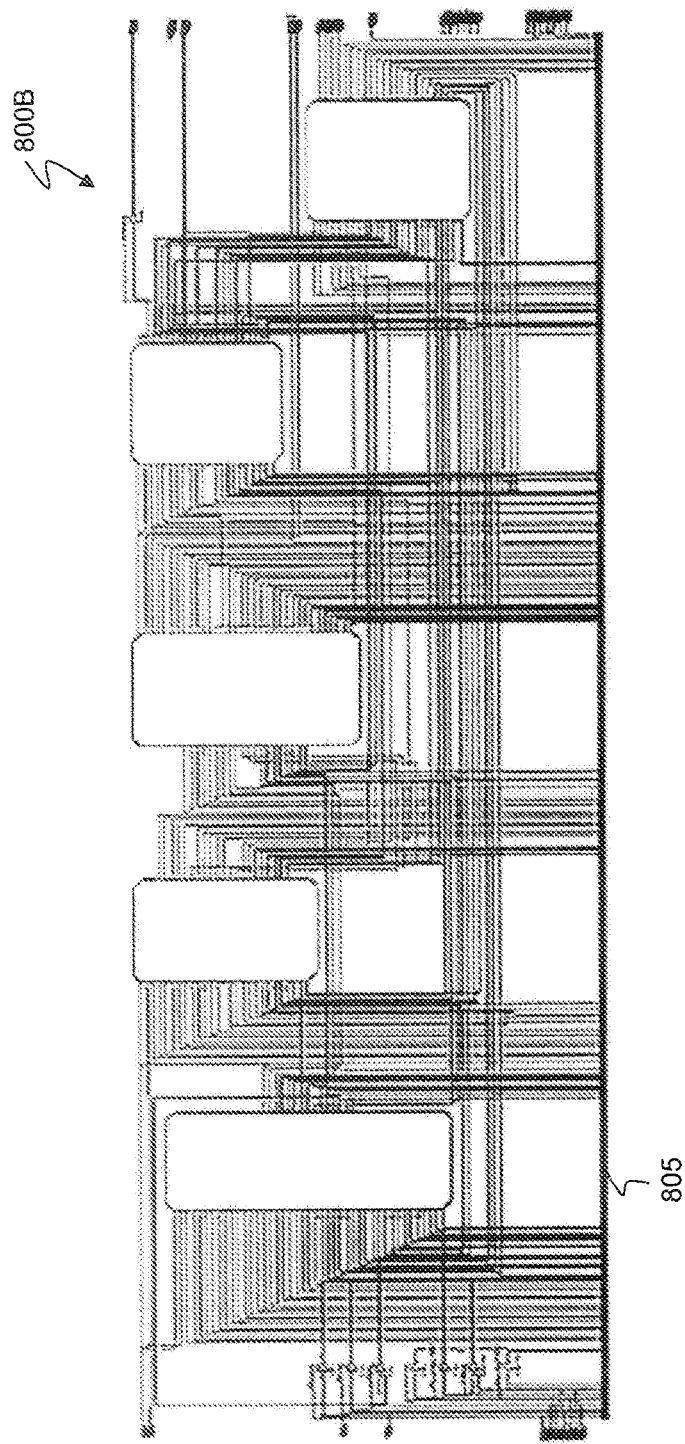
FIG. 8B depicts a schematic diagram with a portion of the wire nets displayed as a single global connection line in accordance with embodiments of the present invention.

FIG. 8B depicts a schematic diagram with a portion of the wire nets displayed as a single global connection line in accordance with embodiments of the present invention. The selected wire nets in dotted-line box 815 of FIG. 8A may be routed via global connection line 805 in schematic diagram 800B. As another example (not shown), a user may input a specific number of wire nets in a schematic diagram (e.g., schematic diagram 800A of FIG. 8A) to be routed through or displayed as a global connection line. The schematic viewer engine may accordingly update the schematic diagram based on the user input (e.g., by routing a specific number of wire nets through a global connection line such as global connection line 805 instead of showing all the wire nets in the schematic diagram).

Figure 9:
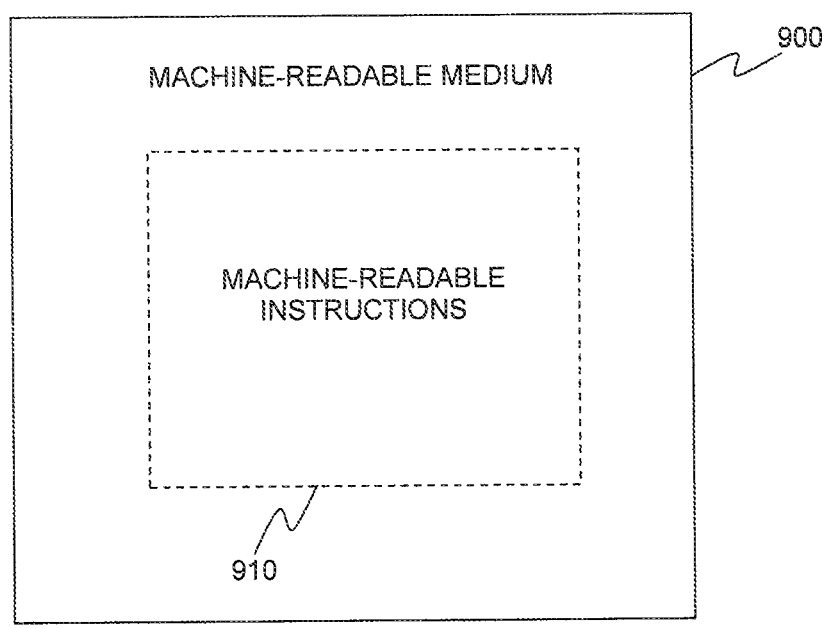
FIG. 9 shows an illustrative machine-readable medium storage medium with machine-readable instructions in accordance with embodiments of the present invention.

The method operations can also be embodied as machine-readable instructions 910 on machine-readable storage medium 900 as shown in FIG. 9. Machine-readable storage medium 900 may be any data storage device that can store data, which can thereafter be read by a machine or a computer system. Illustrative examples of machine-readable storage medium 900 include hard drives, network attached storage (NAS), read-only memory, random-access memory, CDs, DVDs, USB drives, volatile and non-volatile memory, and other optical and non-optical data storage devices. Machine-readable storage medium 900 may also be distributed over a network-coupled computer system so that machine-readable instructions 910 are stored and executed in a distributed fashion. Machine-readable instructions 910 can perform any or all of the operations illustrated in FIGS. 2, 7A and 7B.

Figure 10:
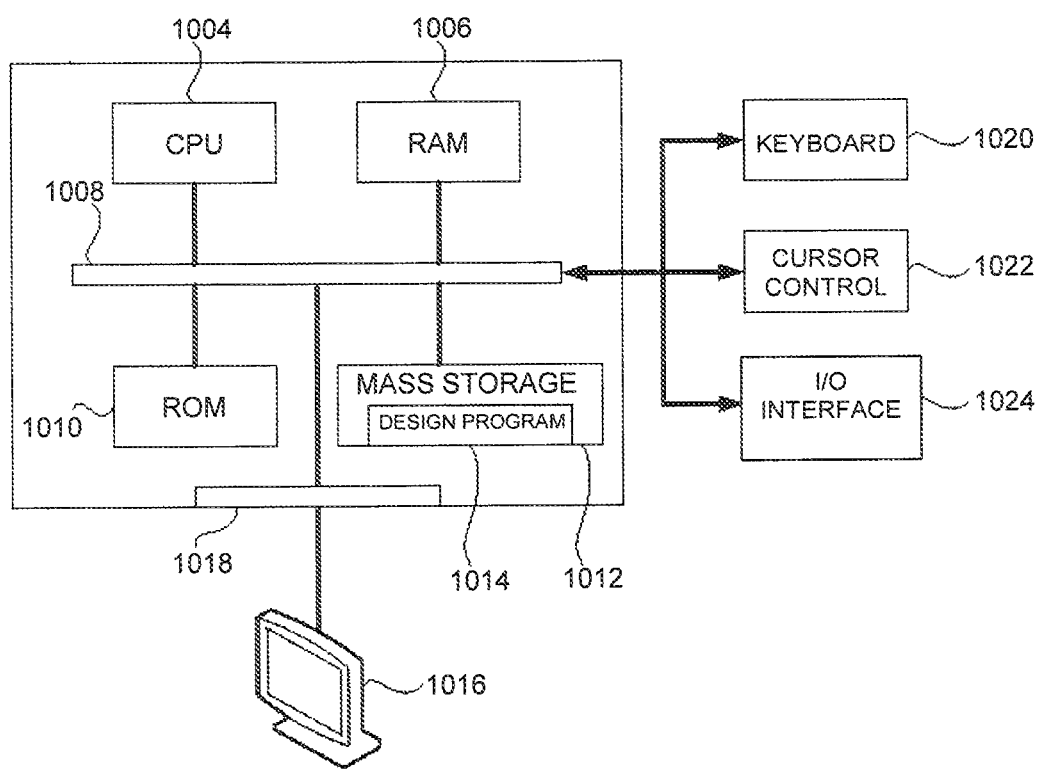
FIG. 10 depicts an illustrative schematic diagram of a computer system for implementing embodiments of the present invention.

FIG. 10 is a simplified schematic diagram of a computer system for implementing embodiments of the present invention. It should be appreciated that the methods described herein may be performed with a digital processing system, such as a conventional, general-purpose computer system. Special-purpose computers, which are designed or programmed to perform one function may be used in the alternative. In addition, the computer system of FIG. 10 may be used to design an integrated circuit. The computer system includes a central processing unit (CPU) 1004, which is coupled through bus 1008 to random access memory (RAM) 1006, read-only memory (ROM) 1010, and mass storage device 1012. Mass storage device 1012 represents a persistent data storage device such as a floppy disc drive or a fixed disc drive, or a flash-based drive, which may be local or remote. Design program 1014 (e.g., an EDA tool that can perform any or all of the operations illustrated in FIGS. 2, 7A and 7B) resides in mass storage device 1012, but can also reside in RAM 1006 during processing. It should be appreciated that CPU 1004 may be embodied in a general-purpose processor, a special-purpose processor, or a specially programmed logic device.

Referring still to FIG. 10, display 1016 is in communication with CPU 1004, RAM 1006, ROM 1010, and mass storage device 1012, through bus 1018. Display 1016 is configured to display the user interface and visual indicators or graphical representations described herein. Display 1016 may also include touch sensors that may be used to receive inputs from a user. Keyboard 1020, cursor control 1022, and input-output interface 1024 are coupled to bus 1008 to communicate information in command selections to CPU 1004. It should be appreciated that data to and from external devices (not shown) may be communicated through input-output interface 1024.

The embodiments, thus far, were described with respect to programmable logic circuits. The method and apparatus described herein may be incorporated into any suitable circuit. For example, the method and apparatus may also be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method of displaying a schematic diagram of an integrated circuit design having a plurality of logic blocks, wherein the schematic diagram includes a plurality of connections between respective groups of the logic blocks, the method comprising:
   using a computer, identifying a plurality of interconnect lines, each of which is adapted to schematically illustrate a respective one of the connections;
   identifying selected interconnect lines out of the plurality of interconnect lines;
   channeling portions of the selected interconnect lines of the plurality of interconnect lines through a global connection line on the schematic diagram, wherein the global connection line is placed on a top region of the schematic diagram, wherein the schematic diagram further comprises an additional global connection line on a bottom region;
   identifying additional selected interconnect lines out of the plurality of interconnect lines; and
   channeling portions of the additional selected interconnect lines through the additional global connection line on the schematic diagram.

2. The method defined in claim 1, wherein the global connection line comprises a graphical line that spans from a first edge of the schematic diagram to a second edge of the schematic diagram, and wherein identifying the selected interconnect lines comprises:
   receiving user input; and
   identifying the selected interconnect lines based at least partly on the received user input.

3. The method defined in claim 1 further comprising:
   counting how many of the interconnect lines are identified as the selected interconnect lines that have portions that are channeled through the global connection line; and
   adjusting a graphical representation of the global connection line on the schematic diagram based on how many of the interconnect lines are identified as the selected interconnect lines and have portions that are channeled through the global connection line.

4. The method defined in claim 1 further comprising:
   initially displaying the global connection line such that the portions of individual selected interconnection lines that are channeled through the global connection line are displayed as a single line;
   expanding the global connection line such that the portions of at least some of the individual selected interconnection lines that are channeled through the global connection line are individually displayed.

5. The method defined in claim 4 further comprising:
   removing the global connection line from the schematic diagram when the global connection line is expanded.

6. A method of displaying a schematic diagram of an integrated circuit design having a plurality of logic blocks, wherein the schematic diagram includes a plurality of connections between respective groups of the logic blocks, the method comprising:
   using a computer, identifying a plurality of interconnect lines, each of which is adapted to schematically illustrate a respective one of the connections;

identifying selected interconnect lines out of the plurality of interconnect lines; and channeling portions of the selected interconnect lines of the plurality of interconnect lines through a global connection line on the schematic diagram, wherein identifying the selected interconnect lines comprises:

for each of the connections between the respective groups of the logic blocks, determining first and second paths that connect that group of logic blocks together, wherein the first path does not pass through the global connection line and wherein the second path does pass through the global connection line;

for each of the connections between the respective groups of the logic blocks, comparing a number of bends in the first path to a number of bends in the second path;

for each of the connections between the respective groups of the logic blocks and in response to determining that the number of bends in the second path is less than the number of bends in the first path, determining that the interconnect line associated with that connection is one of the selected interconnect lines; and for each of the connections between the respective groups of the logic blocks and in response to determining that the number of bends in the second path is greater than the number of bends in the first path, determining that the interconnect line associated with that connection is not one of the selected interconnect lines.

7. The method defined in claim 6 wherein identifying the selected interconnect lines further comprises:

for each of the connections between the respective groups of the logic blocks and in response to determining that the number of bends in the second path is equal to the number of bends in the first path:

determining a distance of the first path and a distance of the second path;

in response to determining that the distance of the second path is greater than the distance of the first path, determining that the interconnect line associated with that connection is not one of the selected interconnect lines; and in response to determining that the distance of the second path is less than the distance of the first path, determining that the interconnect line associated with that connection is one of the selected interconnect lines.

8. A method of generating routing paths in a schematic diagram of an integrated circuit design, the method comprising:

using a computer, identifying a source node and a destination node in the integrated circuit design;

identifying first and second routing paths in the schematic diagram from the source node to the destination node;

comparing a number of bends in the first routing path and a number of bends in the second routing path; and in response to the comparison, displaying one of the first and second routing paths in the schematic diagram on an electronic display device, wherein a portion of the second routing path passes through a global connection line on the schematic diagram, wherein no portion of the first routing path passes through the global connection line, and wherein the global connection line includes portions of multiple routing paths.

9. The method defined in claim 8, wherein the displaying the one of the first and second routing paths comprises displaying the second routing path when the number of bends in the first routing path is greater than the number of bends in the second routing path.

10. The method defined in claim 8, wherein the first routing path comprises a first distance, and wherein the second routing path comprises a second distance, the method further comprising:

comparing the first distance with the second distance; and displaying one of the first and second routing paths in the schematic diagram at least partly based on the comparison between the first distance and the second distance.

11. The method defined in claim 8, the method further comprising:

adjusting a thickness of the global connection line on the schematic diagram based on at least one factor.

12. The method defined in claim 11, wherein the at least one factor comprises at least one factor selected from the group consisting of:

an input received from a user;

a number of routing paths in the global connection line; and space available on the schematic diagram to draw the global connection line.

13. The method defined in claim 11 further comprising:

receiving a user input; and based on the user input, displaying the individual portions of the multiple routing paths in the global connection line.

14. Software on a non-transitory computer readable medium comprising:

code for, with a computer-aided design tool, receiving circuitry design data associated with an integrated circuit device;

code for, with a schematic display viewer engine that is contained in the computer-aided design tool, generating a schematic diagram from the received circuitry design data, wherein the schematic diagram includes at least a global connection line, wherein the generated schematic diagram comprises a plurality of wire nets, and wherein at least some of the plurality of wire nets in the schematic diagram are routed through the global connection line;

code for, with the schematic display viewer engine, determining a total number of wire nets that are routed through the global connection line; and code for, with the schematic display viewer engine, adjusting a thickness of the global connection line based on the total number of wire nets.

15. The software defined in claim 14 further comprising:

code for, with the computer-aided design tool, receiving a user input, wherein the portion of the plurality of wire nets in the schematic diagram is routed through the global connection line based at least partly on the received user input.

16. The software defined in claim 14 further comprising:

code for, with the computer-aided design tool, receiving a user input; and code for, with the schematic display viewer engine, updating the schematic diagram based on the received user input.

17. The software defined in claim 16, wherein updating the schematic diagram comprises:

code for displaying each wire net that is routed through the global connection line; and code for removing the global connection line from the updated schematic diagram.

18. Software on a non-transitory computer readable medium comprising:

code for, with a computer-aided design tool, receiving circuitry design data associated with an integrated circuit device;

code for, with a schematic display viewer engine that is contained in the computer-aided design tool, generating a schematic diagram from the received circuitry design data, wherein the schematic diagram includes at least a global connection line, wherein the generated schematic diagram comprises a plurality of wire nets, and wherein at least some of the plurality of wire nets in the schematic diagram are routed through the global connection line;

code for identifying first and second interconnect paths for a plurality of interconnect logic elements in the received circuitry design data; and code for comparing a number of bends in the first interconnect path with a number of bends in the second interconnect path, wherein the wire nets that are routed through the global connection line are determined in response to the comparison.

* * * * *